Patented Jan. 11, 1949

2,459,126

UNITED STATES PATENT OFFICE 2,459,126

COPOLYMERS OF VINYL COMPOUNDS CONTAINING OLEFINS

Albert M. Clifford, Stow, Ohio, assignor to Wingfoot Corporation, Akron, Ohio, a corporation of Delaware No Drawing. Application June 25, 1940, Serial No. 342,271

7 Claims. (Cl. 260—84.5)

This invention relates to copolymers of certain unsaturated compounds and to methods of preparing the same.

It is known that a polymerized material may be made from acrylonitrile and butadiene, the copolymer having various useful properties and being used for certain industrial purposes. However, the cost of production of the monomeric raw materials is rather high and prevents more widespread use of materials of this type, especially to replace natural rubber which is much cheaper. One factor contributing to the high cost of copolymers or interpolymers containing butadiene is the difficulty of separating this substance from accompanying compounds in all known methods for its production. Thus, butadiene may be obtained by high temperature cracking processes, dehydrogenation or dehydration, depending upon the raw materials utilized, but in every instance the butadiene is always accompanied by olefinic materials, such as propylene, the butenes or butylenes, amylenes, etc. For example, cracking a petroleum oil, kerosene, gas oil, etc. results in a mixture of butadiene and various olefins from ethylene upward; likewise, the dehydrogenation of n-butane yields not only butadiene but also butene-1; and the catalytic dehydration of butane diols gives the butadiene accompanied by various gaseous olefins.

It is extremely difficult to separate the butene or butylene constituents from the butadiene by distillation, the only feasible commercial method, because the boiling points of all of these gases lie close to that of butadiene, —4.5° C. For instance, butene-1 boils at —6.7° C., butene-2 (cis), +3.73° C., butene-2 (trans), +.96° C., isobutylene —6.67° C. and n-butane, which may also accompany the butadiene, at —0.61° C. It is obvious that fractional separation of gases boiling so close together, especially where all are hydrocarbons which are mutually soluble one in the other, is impractical.

In attempts to reduce the cost of production of polymerized materials incorporating butadiene as one constituent, it has been found that satisfactory products having useful characteristics may be prepared from butadiene from which the various olefins have not been separated, the butenes, in particular, entering the polymerization and contributing both mass and modified properties to the resulting product. Such a complex mixture can be readily obtained by cracking various oils of petroleum origin and various gases available from the same source or others. Lighter gases, such as hydrogen, ethylene, etc. can be easily removed and a mixture containing a large proportion of butadiene with a lesser proportion of one or more butenes and perhaps propylene and amylene made available for polymerization.

A butadiene-olefin complex thus obtained can be interpolymerized with various vinyl and substituted vinyl compounds in such manner that both the butadiene and the olefins, particularly the butenes, are combined therewith. Among these vinyl and substituted vinyl compounds may be mentioned acrylonitrile, methacrylonitrile, styrene and 2-chlor butadiene, although it will be apparent that other vinyl compounds may also be used. Butadiene, itself, and, generally speaking, the hydrocarbon butadienes are not included in the vinyl compounds employed because the butadiene is a constituent of the complex which is to be reacted with the vinyl and substituted vinyl compound and it is desired to have the two main constituents of the copolymers of different characteristics. However, polymerization of butadiene in the presence of olefins alone can also be effected to obtain a polymer which is useful for some purposes.

The vinyl compound and the complex mixture containing a butadiene, such as butadiene itself, may be polymerized by any of the various methods known in the art, such as by action of ultraviolet light in the presence or absence of a solvent, or by emulsion polymerization in an aqueous medium containing an emulsifying agent, such as Aquarex D, (sodium salt of sulfate mono esters of higher fatty alcohols, including lauryl), Gardinol WA, (a fatty alcohol sulfate), Wetanol, (a sulfated fatty acid ester), Nekal BX, (sodium alkyl naphthylene sulfonate), sulfatate (sulfonated hydrocarbons) and the like, and preferably an oxidizing agent, such as benzoyl peroxide, sodium perborate, hydrogen peroxide, sodium persulfate or other hydrogen peroxide-yielding substances. These oxidizing agents may also be employed where the monomers are polymerized without the aid of an emulsion, their use increasing the rate of reaction. In the emulsion polymerization, the reaction mass is heated to a temperature usually between 25–80° C. but preferably in the neighborhood of 35–40° C. The reaction is carried on for such length of time as will yield a copolymer of the desired characteristics, this often being obtained before complete polymerization is reached. A period of from a few hours to several days may be requisite.

The ratio of vinyl compound to composite butadiene-olefin mixture may vary over a wide range, say from 25–75% of the vinyl compound to from 75–25% of the composite mixture. Within the composite mixture itself a substantial proportion of a butadiene will always be present and this may vary from 40–95% of the whole, the olefins making up the balance, and consisting chiefly of butenes, amounting correspondingly to from 5–60% of the mixture. Best results have been obtained when about 10–30%, optionally 20%, of olefins are present with the butadiene.

The practice of the invention is illustrated by the following examples.

Example 1

With 111 grams of methacrylonitrile were mixed 113 grams of butadiene of 80–90% purity and containing about 5% propylene and 50 grams of a butylene cut from cracking gases, the cut containing about 13.8% of butadiene. These monomers were polymerized in an aqueous emulsion containing ¼ grams of sodium perborate, 1.4 cc. of 7.78 N-sodium hydroxide, 5.6 grams of $CCl_4$ and 250 grams of a 3% solution of Aresket #300 (mono butyl diphenyl sodium mono sulfonate) as emulsifying agent. The emulsion was heated for 7 days at a temperature of 70° C., the latex having a hydrogen ion concentration corresponding to pH 6.0. The vented gas amounted to 45 grams and a yield of 231 grams (97%) of a copolymer having the properties of a good rubber were obtained.

Example 2

In like manner 100 grams of methacrylonitrile and 97 grams of butadiene were polymerized with 103 grams of the special butylene cut described above, in an emulsion containing the same ingredients as those set forth in Example 1. In this case, the latex had an hydrogen ion concentration of pH 8.0, 96 grams of a gas substantially free from butadiene were vented off and a yield of 197 grams of a tough rubber was obtained after coagulation and drying.

Example 3

Another batch of monomers was processed in the following manner in a large kettle run. To 25 pounds of methacrylic nitrile was added 75 pounds of a butadiene having a purity of 92.9%, the chief constituents of the remaining 7.1% being butenes. These monomers were polymerized at 100° F. in an emulsion containing 120.6 pounds of water, 4.02 pounds of sodium oleate, 0.75 pounds of sodium perborate and 2.80 pounds of carbon tetra chloride. After completion of the polymerization process 25.3 pounds of a 10% phenyl beta naphthylamine emulsion was added to the latex, and the product recovered by coagulation, then drying. A yield of 82.1% of a synthetic rubber was obtained and 13 pounds of residual gases were collected. These residual gases were shown by analysis to contain 80.8% butadiene, the balance, butylenes.

Example 4

In this example, the residual gases vented in Example 3 were employed. To 6 pounds of these vented gases was added 2 pounds of methacrylic nitrile and the other ingredients of the emulsion in the same proportions as prevailed in Example 3. At the end of the run, the conditions being the same as above, a yield of 69.8% of copolymer was obtained and the vented gases in this second case amounted to 1.17 pounds and contained 59.32% butadiene. The significance of this second run is that it shows combination of the butenes in the copolymer, a good yield of copolymer being obtained from the vented gases of Example 3 and the volume of the residual gases being greatly reduced.

The copolymer thus obtained has excellent rubber-like characteristics and is indeed superior in some respects to synthetic rubber prepared from purified butadiene and a vinyl compound, the rubber being softer and more workable on the mill.

As previously pointed out, the invention is of wide application in the field of copolymers, the butadiene containing olefins, such as butenes, being polymerizable with various acrylonitriles and also with styrene, etc. Of course, it is not necessary that the olefins present with the butadiene be selected only from the butenes, although these appear to make the chief contribution to the resulting copolymer or interpolymer. Propylenes, amylenes, butanes, etc. may also be present, but these do no harm, the former two materials possibly contributing to the mass of the polymerized material. It will be seen that the new method effects substantial economies in the preparation of synthetic rubber and other polymerized materials since it does away with the necessity of purifying the butadiene, a difficult and expensive procedure. Also, the synthetic rubbers obtained by the practice of the method are softer and more workable than those heretofore obtained when purified butadiene was employed and hence are valuable for various industrial uses.

What I claim is:

1. A method of preparing a synthetic rubber material which comprises polymerizing in an aqueous emulsion a mixture of about 25 percent to 75 percent of an acrylonitrile having the formula

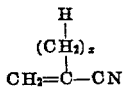

where $x$ is a whole number from 0 to 1 inclusive with about 75 percent to 25 percent of a cracked-petroleum fraction containing about 40 percent to 95 percent of butadiene and about 5 percent to 60 percent of olefins of 3 to 5 carbon atoms.

2. A method of preparing synthetic rubber material which comprises polymerizing in an aqueous emulsion a mixture of about 25 percent to 75 percent of acrylonitrile with about 75 percent to 25 percent of a cracked-petroleum fraction containing about 40 percent to 95 percent of butadiene-1,3 and about 5 percent to 60 percent of butenes.

3. A method of preparing synthetic rubber material which comprises polymerizing in an aqueous emulsion a mixture of about 25 percent to 75 percent of methacrylonitrile with about 75 percent to 25 percent of a cracked-petroleum fraction containing about 40 percent to 95 percent of butadiene-1,3 and about 5 percent to 60 percent of butenes.

4. A synthetic rubber material comprising an aqueous emulsion interpolymer of a mixture of about 25 percent to 75 percent of an acrylonitrile having the formula

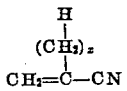

where $x$ is a whole number from 0 to 1 inclusive with about 75 percent to 25 percent of a cracked-petroleum fraction containing about 40 percent to 95 percent of a butadiene-1,3 and about 5 to 60 percent of butenes.

5. A synthetic rubber material comprising an aqueous emulsion interpolymer of a mixture of about 25 percent to 75 percent of an acrylonitrile having the formula

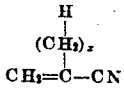

where $x$ is a small whole number from 0 to 1 inclusive with about 75 percent to 25 percent of a mixture containing about 40 to 95 percent of a butadiene-1,3 and about 5 percent to 60 percent of butenes.

6. A synthetic rubber material comprising an aqueous emulsion interpolymer of a mixture of about 25 percent to 75 percent of acrylonitrile with about 75 percent to 25 percent of a mixture containing about 40 percent to about 95 percent of butadiene-1,3 and about 5 percent to 60 percent of butenes.

7. A synthetic rubber material comprising an aqueous emulsion interpolymer of a mixture of about 25 percent to 75 percent of methacrylonitrile with about 75 percent to 25 percent of a mixture containing about 40 percent to about 95 percent of butadiene-1,3 and about 5 percent to 60 percent of butenes.

ALBERT M. CLIFFORD.

REFERENCES CITED

The following references are of record in the file of this patent:

UNITED STATES PATENTS

| Number | Name | Date |
|---|---|---|
| 1,894,661 | Brooks | Jan. 17, 1933 |
| 1,901,354 | Meisenburg | Mar. 14, 1933 |
| 1,938,731 | Tschunkur et al. | Dec. 12, 1933 |
| 1,973,000 | Konrad et al. | Sept. 11, 1934 |
| 2,039,367 | Thomas | May 5, 1936 |
| 2,066,331 | Carothers et al. | Jan. 5, 1937 |
| 2,151,382 | Harmon | Mar. 21, 1939 |
| 2,213,423 | Wiezevich | Sept. 3, 1940 |
| 2,232,515 | Arnold et al. | Feb. 18, 1941 |

FOREIGN PATENTS

| Number | Country | Date |
|---|---|---|
| 360,822 | Great Britain | Oct. 30, 1931 |